US007730138B2

(12) United States Patent
Ballinger et al.

(10) Patent No.: US 7,730,138 B2
(45) Date of Patent: Jun. 1, 2010

(54) POLICY PROCESSING MODEL

(75) Inventors: Keith W. Ballinger, North Bend, WA (US); Hervey O. Wilson, Bellevue, WA (US); Vick B. Mukherjee, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1128 days.

(21) Appl. No.: 10/892,007

(22) Filed: Jul. 14, 2004

(65) Prior Publication Data

US 2006/0041636 A1 Feb. 23, 2006

(51) Int. Cl.
*G06F 15/16* (2006.01)

(52) U.S. Cl. .................... 709/206; 709/207; 709/218

(58) Field of Classification Search .............. 709/218, 709/206–207
See application file for complete search history.

(56) References Cited

U.S. PATENT DOCUMENTS

| 6,061,692 | A | 5/2000 | Thomas et al. ............ 707/200 |
| 6,327,535 | B1 | 12/2001 | Evans et al. .............. 701/300 |
| 6,484,150 | B1 | 11/2002 | Blinn et al. ............... 705/26 |
| 6,493,733 | B1 | 12/2002 | Pollack et al. ............ 715/513 |
| 6,505,244 | B1 * | 1/2003 | Natarajan et al. ......... 709/223 |
| 6,662,235 | B1 * | 12/2003 | Callis et al. .............. 719/318 |
| 6,750,883 | B1 | 6/2004 | Parupudi et al. .......... 345/763 |
| 6,820,121 | B1 * | 11/2004 | Callis et al. .............. 709/225 |
| 7,043,400 | B2 * | 5/2006 | Stobie et al. ............. 702/183 |
| 7,043,659 | B1 * | 5/2006 | Klein et al. ............... 714/4 |
| 7,069,395 | B2 * | 6/2006 | Camacho et al. ......... 711/152 |
| 7,127,701 | B2 * | 10/2006 | Fables et al. ............. 717/104 |
| 7,162,476 | B1 * | 1/2007 | Belair et al. ............. 707/10 |
| 7,171,624 | B2 * | 1/2007 | Baldwin et al. .......... 715/734 |
| 7,177,935 | B2 * | 2/2007 | Bradshaw et al. ........ 709/226 |
| 7,243,157 | B2 * | 7/2007 | Levin et al. ............. 709/233 |
| 7,254,579 | B2 * | 8/2007 | Cabrera et al. .......... 707/10 |
| 7,260,503 | B2 * | 8/2007 | Stobie et al. ............ 702/183 |
| 7,287,063 | B2 * | 10/2007 | Baldwin et al. .......... 709/216 |
| 2003/0061365 | A1 | 3/2003 | White et al. ............. 709/229 |
| 2003/0204405 | A1 * | 10/2003 | Hanson et al. .......... 705/1 |
| 2003/0212540 | A1 | 11/2003 | Meredith et al. ......... 704/4 |
| 2003/0212671 | A1 | 11/2003 | Meredith et al. ......... 707/3 |
| 2003/0212672 | A1 | 11/2003 | Meredith et al. ......... 707/3 |
| 2003/0212818 | A1 * | 11/2003 | Klein et al. ............. 709/238 |
| 2004/0003130 | A1 * | 1/2004 | Becker et al. ........... 709/311 |
| 2004/0034770 | A1 * | 2/2004 | Kaler et al. ............. 713/155 |

(Continued)

OTHER PUBLICATIONS

Yocum, K., et al., "Any Point Communication Protocol," Proceedings Eighth Workshop on Hot Topics in Operating Systems, May 2001, p. 189.

(Continued)

*Primary Examiner*—John Follansbee
*Assistant Examiner*—Saket K Daftuar
(74) *Attorney, Agent, or Firm*—Workman Nydegger

(57) ABSTRACT

Example embodiments provide for processing policies that include policy assertions associated with incoming or outgoing messages of an application in a distributed system, without having to have code within the application for executing the policy assertions. When a message is received by a Web service engine, a policy document associated with an application may be accessed for identifying objects corresponding to policy assertions within the policy document. The objects identified can then be used to generate assertion handlers, which are software entities that include executable code configured to determine if messages can satisfy requirements described by the policy assertions.

27 Claims, 4 Drawing Sheets

U.S. PATENT DOCUMENTS

| | | | |
|---|---|---|---|
| 2004/0060002 A1 | 3/2004 | Lucovsky et al. | 715/513 |
| 2004/0093515 A1* | 5/2004 | Reeves, Jr. | 713/201 |
| 2004/0220947 A1* | 11/2004 | Aman et al. | 707/100 |
| 2004/0225883 A1* | 11/2004 | Weller et al. | 713/166 |
| 2004/0255137 A1* | 12/2004 | Ying | 713/193 |
| 2005/0002333 A1* | 1/2005 | Aalders et al. | 370/230 |
| 2005/0004887 A1* | 1/2005 | Igakura et al. | 707/1 |
| 2005/0050549 A1* | 3/2005 | Joseph et al. | 719/313 |
| 2005/0071658 A1* | 3/2005 | Nath et al. | 713/193 |
| 2005/0080914 A1* | 4/2005 | Lerner et al. | 709/230 |
| 2005/0188072 A1* | 8/2005 | Lee et al. | 709/223 |
| 2005/0198098 A1* | 9/2005 | Levin et al. | 709/200 |
| 2005/0198326 A1* | 9/2005 | Schlimmer et al. | 709/229 |
| 2005/0198351 A1* | 9/2005 | Nog et al. | 709/232 |
| 2005/0261918 A1* | 11/2005 | Carr et al. | 705/1 |
| 2005/0278708 A1* | 12/2005 | Zhao et al. | 717/136 |
| 2006/0020948 A1* | 1/2006 | Carr et al. | 719/318 |

OTHER PUBLICATIONS

Hanson, J. E., et al., "Conversation Support for Business Process Integration," Proceedings Sixth International Enterprise Distributed Object Computing Conference, Sep. 2002, pp. 65-74.

Suzuki, J., et al., "Biologically-Inspired Autonomous Adaptability in a Communication Endsystem: An Approach Using an Artificial Immune Network," IEICE Transactions on Information and Systems, vol. E84-D, Issue 12, Dec. 2001, pp. 1782-1789.

Mitchell, B., "Indigo, Web Services and Extreme Programming," "Benjaminm's Blog", May 21-Jun. 2, 2004, *available at* http://benjaminm.net/default.aspx?date=2004-06-02.

Mitchell, B., "Indigo, Web Services and Extreme Programming," Benjaminm's Blog, Jun. 7-Jun. 30, 2004, *available at* http://benjaminm.net/default.aspx!date=2004-06-30.

Maine, S., "Brain.Save()," Mar. 2-Mar. 17, 2004, *available at* http://hyperthink.net/blog/default,date,2004-03-17.aspx.

Wilson, H., "Security Context Token," Herveyw's Blog: Inside WSE, Jan. 21, 2004, *available at* http://www.dynamic-cast.com/mt-archives/000038.html.

Wilson, H., "Automatic Secure Conversation," Herveyw's Blag:WS-Secure Conversation Archives, Apr. 8, 2004, *available at* http://dynamic-cast.com/mt-archives/cat_wssecureconversation.html.

Atkinson, B., et al., "Web Services Security (WS-Security)," MSDN Library, Version 1.0, Apr. 5, 2002, *available at* http://msdn.microsoft.com/library/en-us/dnglobspec/html/ws-security.asp?frame=true.

Anderson, S., et al., "Web Services Trust Language (WS-Trust)," MSDN Library, Version 1.1, May 2004, *available at* http://msdn.microsoft.com/library/en-us/dnglobspec/html/ws-trust.asp?frame=true.

Anderson, S., et al., "Web Services Secure Conversation Language (WS-SecureConversation)," MSDN Library, Version 1.1, May 2004, *available at* http://msdn.microsoft.com/library/en-us/dnglobspec/html/ws-secureconversation.asp?frame=true.

Box, D., et al., "Web Services Policy Framework (WS-Policy)," Cover Pages, Version 1.1, May 28, 2003, *available at* http://xml.coverpages.org/ws-policyV11.pdf.

Box, D., et al., "Web Services Policy Attachment (WS-Policy Attachment)," Cover Pages, Version 1.1, May 28, 2004, *available at* http://xml.coverpages.org/ws-policyattachmentV11.pdf.

Box, D., et al., "Web Services Policy Assertions Language (WS-Policy Assertions)," MSDN Library, Version 1.1, May 28, 2003, *available at* http://xml.coverpages.org/ws-policyassertionsV11.pdf.

Powell, M., "Programming with Web Services Enhancements 2.0," MSDN Library, May 2004, *available at* http://msdn.microsoft.com/library/en-us/dnwse/html/programwse2.asp?frame=true.

\* cited by examiner

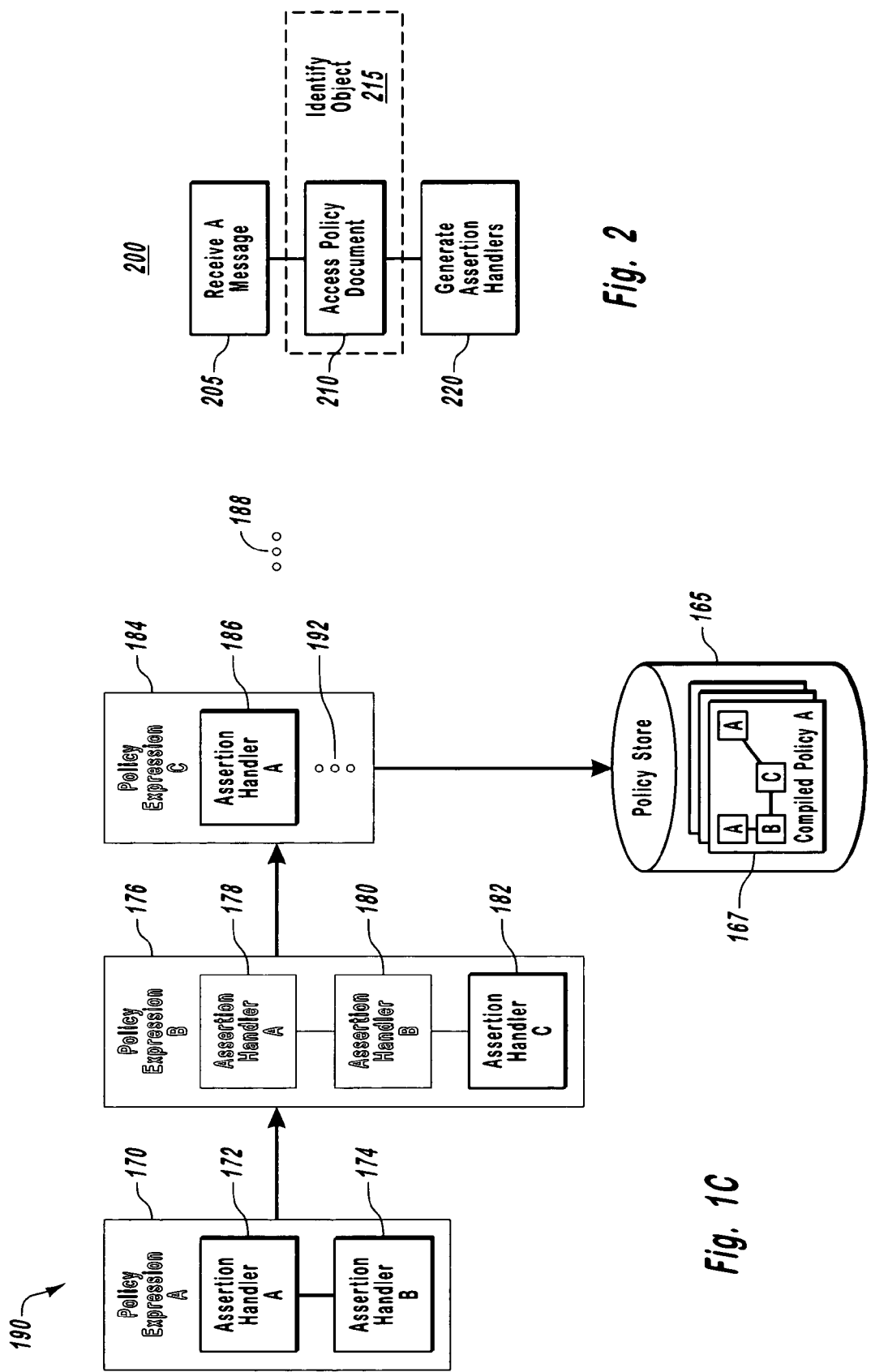

POLICY PROCESSING MODEL

CROSS-REFERENCE TO RELATED APPLICATIONS

N/A

BACKGROUND OF THE INVENTION

1. The Field of the Invention

The present invention generally relates to Web service policies in a distributed system. More particularly, the present invention provides for a policy processing model for determining if messages associated with an application satisfy web service policy assertions.

2. Background and Related Art

Computerized systems provide many advantages towards people's ability to perform tasks. To enable these advantages, computer systems often come equipped with (or are expandable to include) multiple hardware devices that can store or read data or enable a software program to perform a specific action on data. Such devices can include, e.g., a hard drive, a Compact Disk (i.e., CDROM, CDRW, ect.), a Universal Serial Bus (USB) devise (e.g., a printer, a scanner, etc.), and so on. Present computer systems also commonly have installed there on multiple software (or "applications") programs such as a word processing program, a spread sheet program, an imaging program, and an electronic mail program, which instruct the devices to perform specific actions on the data.

Businesses rely heavily on such computerized systems to manage and store information, which is the life blood of most businesses. From a customer relations management suite, or a payroll application to a manufacturing system, businesses increasingly rely on such computerized technology to make better use of various types of information they depend on everyday. These systems typically "built to task, and built to last" perform well in isolation, accomplishing the specified task they were designed for. But true value comes from connecting systems together. For example, say you have a stand alone inventory system. If you don't connect it to anything else, it is not as valuable as it could be. The system can track inventory, but not much more. Inventory information may have to be entered separately in the accounting and costumer relation management systems. The inventory system may be unable to automatically place orders to suppliers. Accordingly, the benefits of such inventory system are diminished by high over head costs.

If, however, you were able to connect your inventory system to your accounting system, such connection has the potential for getting more interesting. Now, whenever you buy or sell something, you potentially have the possibility of your inventory and your cash flow being tracked in one step. If you go further, and connect your warehouse management system, custom ordering systems, supplier ordering systems, and your shipping company, suddenly that inventory management system could be worth a lot more. You could then do end-to-end management of your business while dealing with each transaction only once, instead of once for every system it affects. A lot less work and a lot less opportunity for errors.

Until recently, however, custom integration was thought to be expensive, time-consuming and brittle. For example, because the sales data base and the accounting system are typically not designed to work with each other (i.e., because the data for each application is formatted and accessed according to the way the application program was formatted), connecting the two can be expensive and time-consuming. Accordingly, the potential benefits can be out weighed by such expense and time. Further, even if the systems were able to be integrated, making changes to either or possibly adding other systems could break the link, thereby causing more time and more money.

Web services, however, are turning the way we build and use software inside out. Web services let applications share data, and—more powerfully—invoke capabilities from other applications without regard to how those applications were built, what operating system or platform they run on, and what devices are used to access them. Although Web services remain independent of each other, they can loosely link themselves into a collaborating group that forms a particular task. Web services are invoked over the internet by means of industry-standard protocols including SOAP (Simple Object Access Protocol), eXtensible Markup Language (XML), and Universal Description, Discovery and Integration (UDDI), Web Service Description Language (WSDL), etc.

A key benefit of the emerging Web services architecture is the ability to deliver intergraded, interoperable solutions. Because, however, Web services provide various services from different businesses, organizations, and other service providers via the Internet, security issues are a main concern to protect the information that is transferred. Accordingly, Web service protocols have established security standards that describe enhancements to messaging protocols (e.g., SOAP messaging) to provide quality of protection through message integrity, message confidentiality, and single message authentication.

For instance, there are mechanisms that can be used to accommodate a wide variety of security models and encryption technologies. Some Web service security protocols provide a general-purpose mechanism for associating security tokens with messages. Other Web service securities describe how to encode binary security tokens. Specifically, one specification describes how to encode x509 certificates and Kerberos tickets as well as how to include opaque encrypted keys. This particular service also includes extensibility mechanisms that can be used to further describe the characteristics of the credentials that are included within a message.

By themselves, Web service securities do not ensure security nor do they provide a complete security solution. Web service securities are building blocks that are used in conjunction with other Web services and application-specific protocols to accommodate a wide verity of security models and encryption technologies. For example, Web service securities are used in conjunction with Web service policies, which provide a flexible and extensible grammar for expressing capabilities, requirements, and general characteristics of entities in a Web service-based system.

Web service policies define a framework and a model for the expression of these properties as policies. Policy expressions allow for both simple and declarative assertions as well as more sophisticated conditional assertions. Further, some assertions specify traditional requirements and capabilities that will ultimately manifest on the wire (e.g., authentications scheme, transport protocol selection). Other assertions specify requirements and capabilities that have no wire manifestation yet are critical to proper service selection and usage (e.g., privacy policy, Quality of Service (QoS) characteristics). Nevertheless, Web service policies provide a single policy grammar to allow both kinds of assertions to be reasoned about in a constant manner.

In order to take advantage of the policy and security availabilities provided through Web services, application developers must typically write code within the application itself to access and implement these policy and security features. In addition, they must generate code to determine what policies, if any, apply to a particular type of message, associated with a particular application and destined for an endpoint. Having to create such code in an application, however, has several draw backs. For example, once compiled the defined policies become unchangeable within that particular application, and a new version of the application must be created if changes are desired. Further, if the specified policy and/or security features specified in the application are no longer supported, the application cannot be extended to support alternative updates—unless, of course, an updated version of the application is created. As such, there is neither flexibility nor ease in extending the system. Further, because such application developers are typically not experts in such policy issues, there are security concerns that come into play, as well as performance, stress and/or other robustness factors.

Accordingly, there exists a need for allowing a developer to declaratively state the desired policies in a flexible, extensible and robust manner.

BRIEF SUMMARY OF THE INVENTION

The above-identified deficiencies and draw backs of current Web service applications are over come by the present invention. For example, in a Web services environment for exchanging messages in a distributed system, the present invention provides systems, methods and computer program products for processing policies with policy assertions associated with incoming or outgoing messages of an application, without having to have code within the application for executing the policy assertions.

Example embodiments provide for receiving a message at a Web service engine associated with an application that is external to the Web service engine, the application configured to exchange messages in a distributed system. Further, a policy document associated with the application is accessed for identifying one or more objects corresponding to one or more policy assertions. Based on one or more objects identified in the policy document, one or more assertion handlers are generated. The assertion handlers are software entities that include executable code configured to determine if the received message can satisfy requirements described by the one or more policy assertions.

Other example embodiments provided for the ability to process policies that includes a plurality of policy assertions that make up one or more policy expressions associated with incoming or outgoing messages of an application, without having to have code within the application for executing the one or more policy expressions. Example embodiments provide that a message is received at a Web service engine associated with an application that is external to the web service engine, the application configured to exchange messages in a distributed system. Further, a policy document associated with the application is accessed for identifying a plurality of objects corresponding to a plurality of policy assertions. The policy assertions being combined using one or more logical operators to form a policy expression. Based on information associated with the plurality of objects identified in the policy document, a policy model is generated using one or more assertion handlers, which are software entities that include executable code configured to determine if the received message can satisfy the requirements described by the policy expression.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1C illustrates a compiled policy for outgoing messages in accordance with example embodiments of the present invention;

FIG. 2 illustrates a flow chart of a method of processing policies in accordance with example embodiments.

DETAILED DESCRIPTION OF THE PREFERRED EMBODIMENTS

Figure 1A:
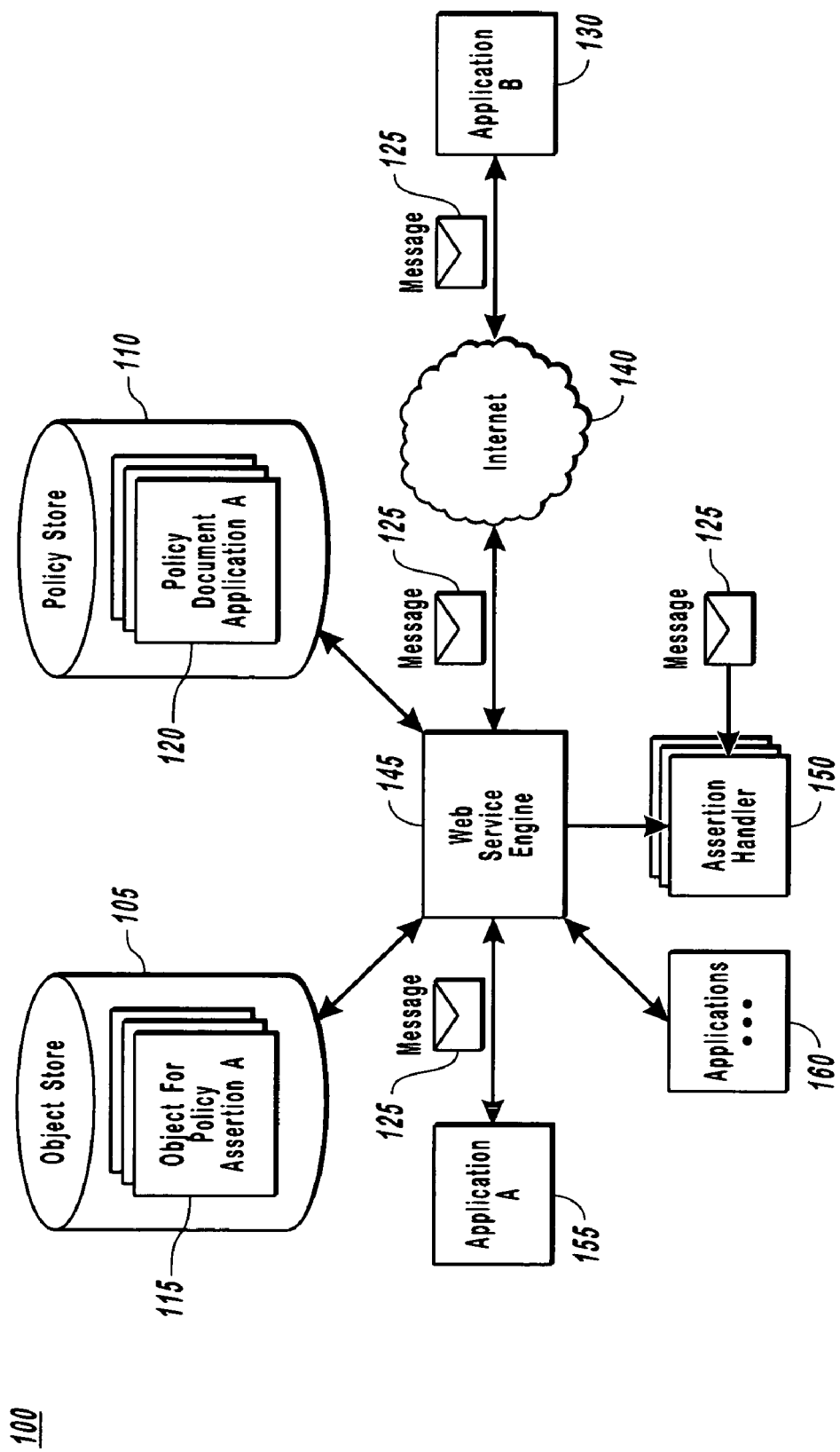
FIG. 1A illustrates a distributed system that utilizes a Web service engine in accordance with example embodiments of present invention.

The present invention extends to methods, systems and computer program products for processing policy assertions when applying policies to messages in a distributed Web service system. The embodiments of the present invention may comprise a special purpose or general-purpose computer including various computer hardware, as discussed in greater detail below.

In order to successfully integrate a Web service (WS), typically Web service applications need to understand each others policies, i.e., the Web service applications' requirements, capabilities, and preferences. The present invention provides for a standard policy framework that makes it possible for developers to express the policies of services in a machine-readable way. Further, the present invention provides for enhancing the Web services infrastructure to understand declarative policy assertions defined by developers and verify and/or enforce them during runtime, without having to have code within the applications for executing such policies. Such a model not only provides for a flexible and expandable description layer, but also offers developers a more declarative programming model.

Example embodiments provide for a policy document, which includes one or more policy expressions. A policy expression is a declarative model (e.g., an XML (eXtensible Markup Language) Infoset as defined in WS-Policy, WS-Security, etc.) of one or more policy assertions, capable of being read by several machines in a heterogeneous system. Policy assertions represent individual preferences, requirements, capabilities, or other general characteristics. For example, a policy expression may be of a generic form for specifying such things as a character encoding, natural language, version of a particular specification, etc. Moreover, as purposes only and is not meant to limit or otherwise narrow the scope of the present invention unless otherwise explicitly claimed.

```
Line 1:   <?xml version="1.0" encoding="utf-8" ?>
Line 2:   <wsp: Policy xmlns:wsp=" . . . " xmlns:wsse=" . . . ">
Line 3:       <wsp:All wsp:Usage="Required">
Line 4:           <wsp:ExactlyOne>
Line 5:               <wsse:SecurityToken>
Line 6:                   <wsse:TokenType>wsse:UsernameToken<wsse:TokenType/>
Line 7:               </ wsse:SecurityToken>
Line 8:               <wsse:SecurityToken wsp:Preference="10">
Line 9:                   <wsse:TokenType>wsse:x509v3<wsse:TokenType/>
Line 10:              </wsse:SecurityToken>
Line 11:              <wsse:SecurityToken wsp:Preference="1">
Line 12:                  <wsse:TokenType>wsse:Kerberosv5st<wsse:TokenType/>
Line 13:              </wsse:SecurityToken>
Line 14:          </wsp:ExactlyOne>
Line 15:          <wsp:All>
Line 16:            <wsse:Integrity>
Line 17:                <wsse:Algorithm Type="wsse:AlgSignature"
                            URI="http://www.w3.org/2000/09/xmlenc#aes" />
Line 18:            </wsse:Integrity>
Line 19:              <wsp:TextEncoding Encoding="utf-8"/>
Line 20:              <wsp:SpecVersion
                            URI="http://www.w3.org/TR/200/NOTE -SOAP-20000508/" />
Line 21:          </wsp:All>
Line 22:      </wsp:All>
Line 23:  </wsp:Policy>
``` described in greater detail below, example embodiments allow a developer to specify their own custom policy assertions within the policy document, e.g., all messages need to have a customer identification, etc. In addition to these generic and custom message assertions, example embodiments provide for a set of security-related policy assertions. Such policies may provide for one or more of security token propagation, message integrity, message confidentiality, visibility (i.e., those portions of a message that should be able to be processed by an intermediary or endpoint), message age (i.e., the acceptable time period before messages are discarded), etc., through one or more of a signature, encryption, token, username/password credentials, etc.

In accordance with other embodiments, policy assertions and/or policy expressions (i.e., one or more policy assertions) can be combined using a variety of logical operators, e.g., usage qualifiers, policy operators, policy preferences, etc. Usage qualifiers help to distinguish between different types of policy assertions/expressions and how they are to be processed. For example, usage qualifiers may indicate that a policy assertion (or expression) is required, not supported, optional, processed but ignored, etc. Optionally, or in conjunction, policy operators can be used to combine assertions/expressions. For example, policy operators can require that all, exactly one, one or more, etc., child elements be satisfied. In situations where there are multiple choices for a given capability or requirement, policy preference attributes may be used to specify the service's preference as, e.g., an integer value, where a higher number may represent a higher preference.

The following illustrates an example policy document expressed in XML language. The following file and the description thereof are used to illustrate how the different sections can be related through the use of XML. It should be noted, however, that other formats and languages can be used to implement the present invention. Accordingly, the following example of a policy document is used for illustrative The above XML example represents a policy document that includes a policy expression with two policy conditions, each with multiple policy assertions. Line 1 identifies the document as an XML file. The XML policy expression is embedded between Lines 2-23, which includes the XML policy conditions as shown between Lines 4-14 and 15-21, respectively. It should be noted that the XML policy document may include other elements other than just the XML policy, e.g., a XMLpolicy mapping file.

As shown above in the XML policy expression in Line 3, the two policy conditions are required (as indicated by both the "All" policy operator and the "Required" usage qualifier). Within the first expression (shown in Lines 4-14), exactly one of a Username Token, x509 token or Kerberos security token is required for the message. Further, the second policy expression (shown in Lines 15-21) requires the message have all of the following characteristics: (1) a digital signature; (2) UTF-encoding; and (3) SOAP 1.1.

Example embodiments provide for a Web service engine configured to assist applications in exchanging messages between endpoints of a Web service system. A Web service endpoint is an entity, processor, and/or resource (e.g., another application or portion of an application) where Web service messages can be targeted. Endpoint identifiers or references convey the information needed to identify/reference a Web service endpoint, and may be used in several different ways. For example, endpoint identifiers are suitable for conveying the information needed for accessing a Web service endpoint. They are also used to provide addresses for individual messages sent to and from Web services.

A request-reply is a common interaction pattern that consists of an initial message sent by a source endpoint (the request) and subsequent message sent from the destination of the request back to the source (the reply). A reply can be an application message, a fault, or any other message. FIG. 1A shows an exemplary Web service system 100 in which request-reply messages 125 are exchanged between various endpoints. For example, exemplary embodiments provide for a centralized Web service engine 145 capable of assisting in communicating messages 125 between various applications or other endpoints within a distributed system 100.

The Web service engine 145 assists applications within the distributed system 100 by controlling access to Web services policies, e.g., Web service security. Further, as described in greater detail below, the Web service engine can generate assertion handlers 150, which are software entities that include executable code configured to determine if messages 125 satisfy requirements described by the policy document 120 for a particular application, e.g., application 155. Further, The Web service engine 145 can control access to Web service policies and generate assertion handlers for any number of applications, as indicated by the horizontal ellipsis " . . . " for application(s) 160.

As shown in FIG. 1A, applications (e.g., application A 155, application B 130 and application(s) " . . . " 160) communicate messages 125 through the request-reply technique described above. The applications 155, 130, 160 will typically reside on different systems and the messages can be transferred over the Internet 140 using well known standard formats and protocols such as HyperText Transfer Protocol (HTTP), Web Services Description Language (WSDL), Simple Object Access Protocol (SOAP), etc. Of course, the applications could reside on a network linked through other transport formats and protocols. As such, the use of the Internet 140 and its protocols for transferring messages between applications in a distributed system 100 is used for illustrative purposes only, and is not meant to limit or otherwise narrow the scope of the present invention.

As previously stated, example embodiments allow for developers to created policy documents 120 for various applications and store them in, e.g., a policy story 110 accessible by Web service engine 145. Such policy documents are declarative models (e.g., an XML Infoset) of one or more policy expressions, capable of being read by several machines in a heterogeneous system. The Web service system 100 can use these policy documents for generating assertion handlers 150 to process policies associated with incoming or outgoing messages 125 of an application (e.g., application 155), without having to have code within the application 155 for executing the policies.

For example, when a message is received by Web service engine 145 for an application (it should be noted that "received" in this context should be construed broadly, especially in terms of claim language, to refer to messages sent by and intended for the corresponding application, e.g., outgoing or incoming messages for application A 155) the Web service engine 145 can retrieve or access the appropriate policy document 120 from policy store 110. The identification of the appropriate policy document 120 may be based on information provided in the message 125, e.g., destination or originating endpoint identifier, message identifier, message type, etc. Regardless of how the policy document 120 is identified and accessed, Web service engine 145 can be configured to parse through the policy document and identify the various policy assertions. Further, the Web service engine 145 can then identify one or more objects corresponding to the identified policy assertions and generate assertion handlers 150 based thereon.

As previously stated, the assertion handlers 150 are software entities that include executable code configured to determine if the received message satisfies requirements described by the policy assertions. The object information may be provided for directly in the policy document 120, thereby allowing a developer to create custom objects. Alternatively, or in conjunction, the policy assertions can include policy identifiers that point to the appropriate object out on the distributed system 100, e.g., policy object 115 in policy object store 105. This identifier may be, e.g., a name using a universal record identifier (URI), or any other suitable way for uniquely identifying the appropriate object.

Regardless of how the object is identified, Web service engine 145 is configured to use information provided therein to create an instance of the object, referred to above as an assertion handler 150. As will be described in greater detail below, if the message is incoming to the application, the message 125 may be evaluated to determine if the message satisfies the requirements described by the policy assertion. Alternatively, if the message 125 is an outgoing message, the assertion handlers are configured to be able to change a message to conform to the requirements described by the policy assertion.

Figure 1B:
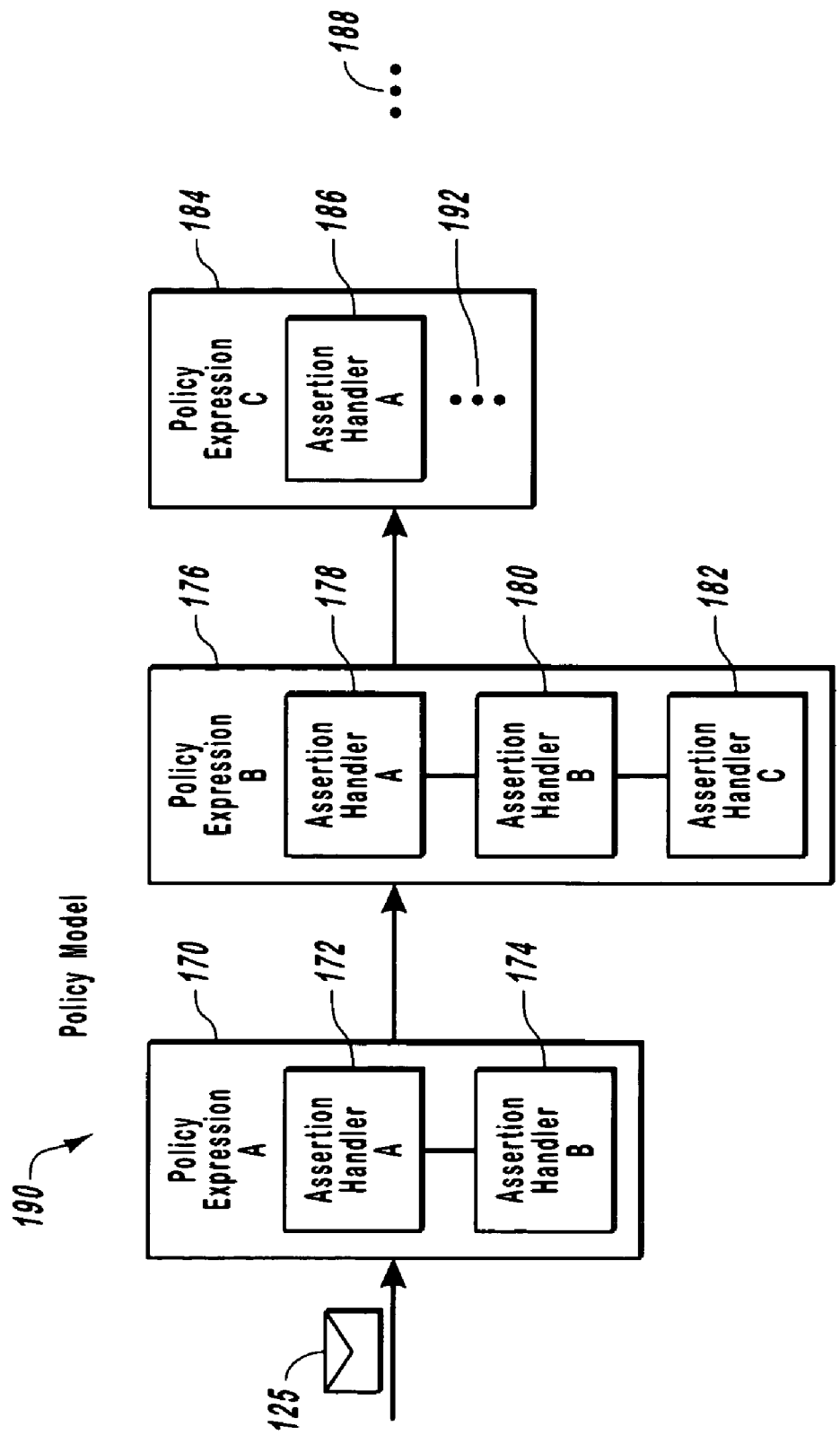
FIG. 1B illustrates a policy model with assertion handlers for a plurality of policy expressions in accordance with example embodiments of the present invention.

Other example embodiments provide that the Web service engine can also identify the logical operators and form a policy model based thereon. FIG. 1B illustrates a policy model 190 that Web service engine 145 may be able to generate based on logical operators within policy document 120. Each policy expression representation within the policy model 190 (e.g., policy expression A 170, policy expression B 176 and policy expression C 184) will have one or more assertion handlers 150 combined together using code to represent the logical operators previously described.

For example, policy expression A 170 may be an integrity expression having two policy assertion handlers (A 172 and B 174) linked together by a representation for an optional usage qualifier with policy preferences associated therewith. Policy expression B, on the other hand, may be a confidentiality expression combining its corresponding assertion handlers (shown here as assertion handlers A 178, B 180 and C 182) through an <All> policy operator or required usage qualifier. Moreover, policy expression C 184 may be a message age expression with only one assertion handler (A 186).

Of course, as represented by vertical ellipsis (" . . . ") for policy expression C 184, any number of assertion handlers can be combined using any number and any ordering of logical operators, as previously described. In addition, any number of representations of policy expressions can also be combined using any number and any ordering of logical operators, as indicated by horizontal ellipsis 188. Accordingly, the policy model 190 shown in FIG. 1B and described above is used for illustrative purposes only and is not meant to limit or otherwise narrow the scope of the present invention.

Once the policy model 190 is generated in accordance with the corresponding objects and logical operators, example embodiments provide that a message 125 is capable of being verified in accordance with the policy requirements on incoming messages. For example, message 125 can be passed through policy model 190 and various combinations of policy assertions described by the expressions (i.e., the alternatives for which the message can be verified) are evaluated by each corresponding assertion handler. If any of the assertion handlers and their corresponding alternatives, if any, cannot be validated within an expression—or in the case where alternative expressions cannot be validated—then the message 125 does not pass the policy verification. In such instance, an error may be returned to the appropriate application, message 125 may be discarded, or any other appropriate action can be made.

In accordance with other example embodiments, the policy model 190 may be used to enforce policies on outgoing message 125. FIG. 1C illustrates the use of the policy model 190 for generating a compiled policy 167 and storing such for changing properties on messages 125 to conform to the requirements described by the compiled policy 167. For example, Web service engine 145 can enumerate through the policy alternatives, similar to that described above with regard to incoming messages. The first alternative assertion handler (or expression as the case maybe) determined capable of changing a message to conform to the requirements described by the policy assertions is converted into a form called a compiled policy 167.

For example, as shown in FIG. 1C, when evaluating policy model 190 each policy expression (i.e., policy expressions A, B and C, 170,176, 184, respectively) is combined such that each must be satisfied. Further, if the assertion handlers 172, 174 for policy expression A 170 also must each be satisfied, whereas exactly one of the assertion handlers 178, 180, 182 for policy expression B 176 are required, and one or more assertion handlers 186, 192 for policy expression C must be satisfied, then the following illustrates how a compiled policy may be determined.

The Web service engine 145 will first go through policy expression A 170 to ensure that each assertion handler 172, 174 can change an outgoing message in accordance with the corresponding policy assertion. If not, then the process may be halted and an error returned to the application. If, however, both assertion handlers are capable of changing the message to conform to the required policy assertions, then policy expression B 176 may be evaluated.

If more than one or none of the assertion handlers 178, 180, 182 for policy expression B 176 are capable of changing the message, then as before the process is halted and an error is returned to the system (since the exactly one operator is used). On the other hand, if exactly one of the assertion handlers (shown here as assertion handler C 182) is capable of changing the message, then the Web service engine 145 may enumerate through policy expression C 184.

Similar to the other two enumerations, if none of the assertion handlers 186, 192 for policy expression C 184 can change the message, an error is returned. If, however, one or more assertion handlers (shown here as assertion handler A 186) can change the message, then a compiled policy 167 is generated. This compiled policy 167 may then be stored, e.g., in policy store 165, and used for processing future messages with similar endpoint destination/sources and/or message types (e.g., reply, request, failure, etc.).

For efficiency purposes, the first assertion handler(s) determined to be configured to change the message 125 in accordance with the corresponding policy assertions/expressions may be used; however, such optimization is not necessary for implementing the present invention. Further, it should be noted that the assertions handlers are configured to examine the message and not make changes if the messages already conforms to the policy. Moreover, other example embodiments provide for optimizing the policy compiling process described above by determining when one of the assertion handlers within the compiled policy 167 is no longer capable of changing a message to conform to the appropriate policy requirements. For example, a policy assertion may indicate "use a specific x509 certificate containing cryptographic information to encrypt messages." Initially the assertion handler representing this assertion may be capable of doing this operation; however, in time the x509 certificate may expire, thereby rendering the assertion handler incapable of using the correct cryptographic key. In such situations, the present invention provides for again enumerating through the policy alternatives for the policy model 190 in a similar manner described above, in an attempt to determine a new compiled policy 167. If no such alternative exists, then the message does not pass policy enforcement and the system can indicate such to the user, the application, etc.

It is noted that although the above described creation of a compiled policy 167 used policy operators as the logical operators, other logical operators are available for constructing the compiled policy. For example, policy preferences could be used in conjunction with usage qualifiers to determine those assertion handlers capable of changing the message to conform to the requirements of the policy assertions. Accordingly, the use of the policy operators for constructing the compiled policy 167 is used for illustrative purposes only and is not meant to limit or otherwise narrow the scope of the present invention unless otherwise explicitly claimed.

It should be noted that although the above example for generating and storing a compiled policy enumerated through each policy expression one by one and halted the process if one expression was not satisfied, alternative processing techniques are available. For instance, even if one policy expression cannot be satisfied, the others may still be scanned to determine if more than one cannot be satisfied. In such instances, example embodiments allow for reporting either those expressions that cannot be satisfied, or those that can, or both. As one would recognize, other alternative processing techniques (e.g., default values, etc.) are also available. For example, only one policy expression may be required; and therefore, only one or more of the assertion handlers from a possible series of assertion handlers associated with such expression may need to be evaluated. As such, the above example for generating and storing a compiled policy 167 is used for illustrative purposes only and is not meant to limit or otherwise narrow the scope of the present invention.

The present invention may also be described in terms of methods comprising functional steps and/or non-functional acts. The following is a description of steps and acts that may be performed in practicing the present invention. Usually, functional steps describe the invention in terms of results that are accomplished, whereas non-functional acts describe more specific actions for achieving a particular result. Although the functional steps and non-functional acts may be described or claimed in any particular order, the present invention is not necessarily limited to any particular order or combination of acts and/or steps. Further, the use of acts and/or steps in the recitation of the claims and in the following description of the flow chart for FIG. 2 are used to indicate the desired specific use of such terms.

FIG. 2 illustrates an example flow chart for various exemplary embodiments of the present invention. This following description of FIG. 2 will occasionally refer to corresponding elements from FIGS. 1A-C. Although reference maybe made to a specific element from these Figures, such elements are used for illustrated purposes only and are not meant to limit or otherwise narrow the scope of the present invention unless otherwise explicitly claimed.

FIG. 2 illustrates an example flow chart of a method for processing policies associated with incoming or outgoing messages of an application, without having to have code within the application for executing the policy assertions. Method 200 includes an act of receiving 205 a message at a Web service engine. For example, Web service engine 145 may receive a message 125 associated with an application 155, 160 where the application is external to the Web service engine 145. Further, the application 155, 160 is configured to exchange messages in a distributed system 100 and the message 125 may be in the form of a SOAP message and be any type of a reply, request, failure, or other type message.

Method 200 also includes a functional step for identifying 215 an object. Step 215 may include an act of accessing 210 a policy document. For example, Web service engine 145 may be used to access policy document 120 associated with an application (e.g., application A 155) for identifying objects 115 corresponding to policy assertions. The objects 115 may be within the policy document 120 and application 155 specific to policies defined by a developer of the application 155. Further, the policy document 120 may be an eXtensible Markup Language (XML) document that includes policy identifiers for pointing to the objects 115 in, e.g., a store 105.

The policy assertions may represent preferences, requirements, capabilities or other properties associated with exchanging messages 125 with the application 155. For example, the policy assertions may be security policies that provide one or more of security token propagation, message integrity and message confidentiality through one or more of a signature, encryption, token, and username/password credentials. Alternatively, or in conjunction, the policy assertions may be a message age requirement that specifies the acceptable time period the received message should be received by, reliable messaging assurances or a visibility requirement that specifies one or more portions of the received message be able to be processed by an intermediary or endpoint.

Method 200 also includes an act of generating 220 assertion handlers. For example, based on the objects 115 identified in the policy document 120, assertion handlers 150 may be generated. The assertions handlers 150 being software entities that include executable code configured to determine if the received message 125 can satisfy requirements described by the policy assertions. Example embodiments also provide for determining if the message is either outgoing or incoming from the application 155. Based on the determination, the policy assertions may be validated or enforced by processing the received message through the corresponding assertion handlers 150. In addition, the Web service engine 145 may receive, validate and/or enforce policies for a plurality of applications, e.g., applications " . . . " 160.

Example embodiments also provide that the assertion handlers 150 may be generated based on a plurality of objects 115 identified in the policy document 120. In such instance, the assertion handlers 150 may be configured in series to determine if the received message 125 can satisfy the requirements described by policy assertions corresponding to the plurality of objects 115.

Other example embodiments provide a method of processing policies that include a plurality of policy assertions associated with incoming or outgoing messages 125 of an application 155. Similar to above, a message 125 may be received at a Web service engine 145 associated with an application 155, and a policy document 120 may be accessed that is also associated with the application 155. In this embodiment, however, the policy document is accessed for identifying a plurality of objects 115 corresponding to a plurality of policy assertions, which are combined using logical operators to form a policy expression, e.g., 170, 176, 184. The logical operators may be one or more of usage qualifiers, policy operators, policy preferences, etc. Based on information associated with the plurality of objects 115 identified, a policy model 190 using assertion handlers 172, 174, 178, 180, 182, 186, 192 may be generated for determining if the message 125 can satisfy the requirements described by the policy expression 170, 176, 184.

Still other example embodiments provide that if the message 125 is an outgoing message, then one or more of the assertion handlers 155, 172, 174, 178, 180, 182, 186, 192 may be evaluated to determine if the message can be changed to meet the requirements. Those assertion handlers 150, 172, 174, 178, 180, 182, 186, 192 determined to be configured to change the message are formatted to form a compiled policy, e.g., compiled policy 167, for changing the received message 125 to meet the requirements. The compiled policy may be stored, e.g., in policy store 165, for applying to messages with a similar endpoint destination and message type. Further, if one or more of the assertion handlers 150 are no longer capable of changing the message to conform to the requirements described by corresponding policy assertions, example embodiments provide for returning an error to the application and possibly recycling through the above process for generating the compiled policy 167. Other embodiments provide that the assertion handlers 150, 172, 174, 178, 180, 182, 186, 192 are capable of examining the message 125 and not make any changes if the message 125 already conforms to the corresponding policy assertion.

Example embodiments also provide that the Web service engine 145 may receive messages 125, validate and enforce policies for a plurality of applications " . . . " 160. Further, the policy mapping file may be XML document.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, computer-readable storage media can comprise RAM, ROM, EEPROM, CD-ROM or other optical disk storage, magnetic disk storage or other magnetic storage devices, or any other medium which can be used or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable communications medium. Thus, any such connection is properly termed a computer-readable communications medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 3:
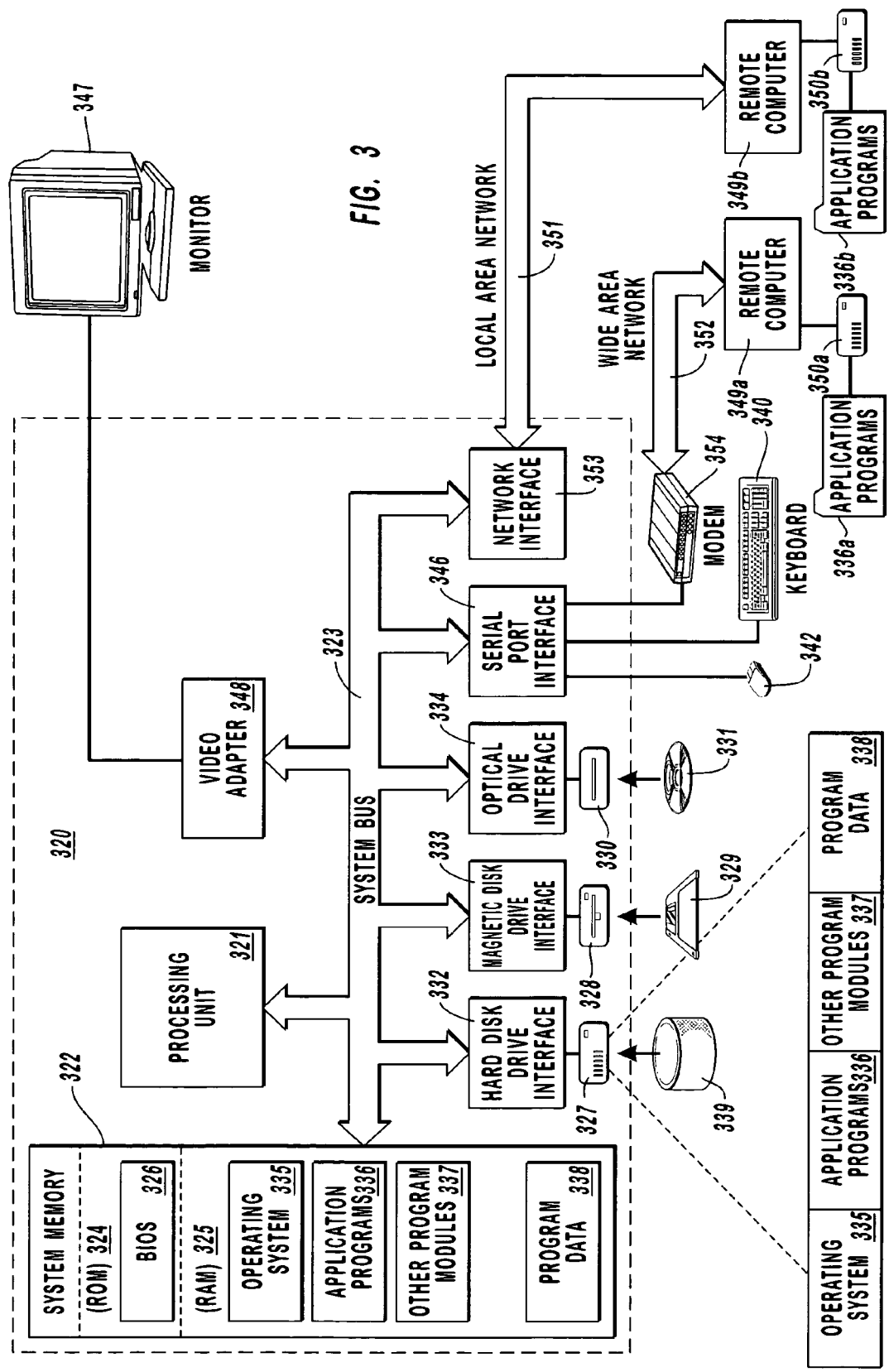
FIG. 3 illustrates an example system that provides a suitable operating environment for the present invention.

FIG. 3 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 3, an exemplary system for implementing the invention includes a general purpose computing device in the form of a conventional computer 320, including a processing unit 321, a system memory 322, and a system bus 323 that couples various system components including the system memory 322 to the processing unit 321. The system bus 323 may be any of several types of bus structures including a memory bus or memory controller, a peripheral bus, and a local bus using any of a variety of bus architectures. The system memory includes read only memory (ROM) 324 and random access memory (RAM) 325. A basic input/output system (BIOS) 326, containing the basic routines that help transfer information between elements within the computer 320, such as during staff-up, may be stored in ROM 324.

The computer 320 may also include a magnetic hard disk drive 327 for reading from and writing to a magnetic hard disk 339, a magnetic disk drive 328 for reading from or writing to a removable magnetic disk 329, and an optical disk drive 330 for reading from or writing to removable optical disk 331 such as a CD-ROM or other optical media. The magnetic hard disk drive 327, magnetic disk drive 328, and optical disk drive 330 are connected to the system bus 323 by a hard disk drive interface 332, a magnetic disk drive-interface 333, and an optical drive interface 334, respectively. The drives and their associated computer-readable media provide nonvolatile storage of computer-executable instructions, data structures, program modules and other data for the computer 320. Although the exemplary environment described herein employs a magnetic hard disk 339, a removable magnetic disk 329 and a removable optical disk 331, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 339, magnetic disk 329, optical disk 331, ROM 324 or RAM 325, including an operating system 335, one or more application programs 336, other program modules 337, and program data 338. A user may enter commands and information into the computer 320 through keyboard 340, pointing device 342, or other input devices (not shown), such as a microphone, joy stick, game pad, satellite dish, scanner, or the like. These and other input devices are often connected to the processing unit 321 through a serial port interface 346 coupled to system bus 323. Alternatively, the input devices may be connected by other interfaces, such as a parallel port, a game port or a universal serial bus (USB). A monitor 347 or another display device is also connected to system bus 323 via an interface, such as video adapter 348. In addition to the monitor, personal computers typically include other peripheral output devices (not shown), such as speakers and printers.

The computer 320 may operate in a networked environment using logical connections to one or more remote computers, such as remote computers 349a and 349b. Remote computers 348a and 349b may each be another personal computer, a server, a router, a network PC, a peer device or other common network node, and typically include many or all of the elements described above relative to the computer 320, although only memory storage devices 350a and 350b and their associated application programs 336a and 336b have been illustrated in FIG. 3. The logical connections depicted in FIG. 3 include a local area network (LAN) 351 and a wide area network (WAN) 352 that are presented here by way of example and not limitation. Such networking environments are commonplace in office-wide or enterprise-wide computer networks, intranets and the Internet.

When used in a LAN networking environment, the computer 320 is connected to the local network 351 through a network interface or adapter 353. When used in a WAN networking environment, the computer 320 may include a modem 354, a wireless link, or other means for establishing communications over the wide area network 352, such as the Internet. The modem 354, which may be internal or external, is connected to the system bus 323 via the serial port interface 346. In a networked environment, program modules depicted relative to the computer 320, or portions thereof, may be stored in the remote memory storage device. It will be appreciated that the network connections shown are exemplary and other means of establishing communications over wide area network 352 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method implemented in a Web services environment used for exchanging messages within a distributed system, the method for processing policies that include a plurality of policy assertions associated with incoming or outgoing messages of an application, without having to have code within the application for executing the one or more policy assertions, the method comprising acts of:

receiving a message at a Web service engine, the message being an outgoing message and having been sent by a sending application of a sender to a receiving endpoint or a receiver, the sender and the receiver being external to, and separate from, the Web service engine, and the application configured to exchange messages in a distributed system; and prior to receipt of the message by the receiver, and at the Web service engine disposed between the sender and the receiver:

accessing a policy document that is specific to the application sending the message received at the Web service engine, the policy document having been generated by the developer of the application sending the message received at the Web service engine and for identifying a plurality of objects corresponding to a plurality of policy assertions included in the policy document;

after identifying the plurality of objects identified in the policy document, generating at least one assertion handler for each object, which assertion handlers are software entities that include executable code configured to determine whether the received message can satisfy requirements described by the plurality of policy assertions included in the policy document generated by the developer of the application; and using the at least one assertion handler to determine whether the received message satisfies the requirements described by the policy document;

evaluating the at least one assertion handler to determine whether the received message can be modified using a first compiled policy to satisfy the requirements described by the policy document, the first compiled policy being formatted from the evaluated at least one assertion handler, wherein the first compiled policy is stored for applying to messages with similar endpoint destination and message types, and wherein when one or more of the at least one assertion handlers used to modify the received message are determined to be no longer capable of changing the message to conform to the requirements, an error is returned to the sending application;

after evaluating the at least one assertion handler to determine whether the received message can be modified using the first compiled policy, evaluating one or more of the plurality of assertion handlers to determine whether the message can be modified to satisfy the requirements described by the policy document, and by using a second compiled policy for modifying the message to satisfy the requirements, wherein the second compiled policy is formatted from the one or more one assertion handlers evaluated to determine whether the message can be modified using the second compiled policy; and discarding of the received message when the message fails to satisfy or cannot be modified to satisfy such requirements of the policy document.

2. The method of claim 1, wherein the policy document includes one or more policy identifiers for pointing to one or more of the plurality of objects.

3. The method of claim 1, wherein the plurality of assertion handlers are configured in series to determine whether the received message satisfies the requirements described by the plurality of policy assertions corresponding to the plurality of objects.

4. The method of claim 1, further comprising the act of:
determining whether the message is either outgoing or incoming from the application; and
based on the determination, validating or enforcing the plurality of policy assertions by processing the received message though the corresponding plurality of assertion handlers.

5. The method of claim 1, wherein the plurality of policy assertions include security policies that provide one or more of security token propagation, message integrity and message confidentiality though one or more of a signature, encryption, token, and username/password credentials.

6. The method of claim 1, wherein the plurality of policy assertions include one or more of a message age requirement that specifies the acceptable time period the received message should be received by or a visibility requirement that specifies one or more portions of the received message be able to be processed by an intermediary or endpoint.

7. The method of claim 1, wherein at least one of the plurality of objects is within the policy document.

8. The method of claim 1, wherein the Web service engine receives messages, validates and enforces policies for a plurality of applications.

9. The method of claim 1, wherein the policy document is an eXtensible Markup Language (XML) WS-Policy or WS-Security document.

10. A method implemented in a Web services environment used for exchanging messages within a distributed system, the method for processing policies that includes a plurality of policy assertions that make up one or more policy expressions associated with incoming or outgoing messages of an application, without having to have code within the application for executing the one or more policy expressions, the method comprising acts of:

receiving a message at a Web service engine, the message being an outgoing message having been sent by a sending application to a receiving endpoint of a receiver, the sending application being a part of a sending computing system and the Web service engine being external to the sending computing system and the receiver, and the sending application being configured to exchange messages in a distributed system; and at the Web service engine disposed between the sending computing system and the receiver, and after receipt of the message by the Web service engine that is external to the sending application and prior to receipt of the message by the receiver:

accessing a policy document that is specific to the application sending the message received at the Web service engine and stored in a policy store along with other policies specific to other applications, the policy document including a plurality of policy expressions combined by one or more policy operators and having been generated by the developer of the application sending the message received at the Web service engine and for identifying a plurality of objects corresponding to a plurality of policy assertions included in the policy document, the policy assertions being in the form of declarative statements and being combined using one or more logical operators to form a policy expression, and wherein the policy document includes policy identifiers for pointing to policy objects stored in an object store outside the policy store;

after identifying the plurality of objects stored outside the policy document and in the object store, generating a policy model using a plurality of assertion handlers, which are software entities that include executable code configured to determine whether the received message can satisfy the requirements described by the policy expression included in the policy document generated by the developer of the application; and using the assertion handlers to determine whether the received message can be modified using a compiled policy document to satisfy the requirements described by the policy document, which comprises:

evaluating at least one assertion handler for at least one of the plurality of policy expressions to determine whether the message can be changed to meet the requirements of the corresponding policy expression, wherein one or more of those assertion handlers determined to be configured to change the message are formatted to form a first compiled policy from the policy model for changing the received message to meet the requirements described by the policy expressions;

storing the first compiled policy for application to other messages of similar message types and endpoint destination;

determining that one or more of the assertion handlers determined to be configured to change the received message are no longer capable of changing the message to conform to the requirements described by corresponding policy assertions and, in response, returning an error to the application; and evaluating one or more of the plurality of assertion handlers to determine whether the message can be changed to meet the requirements, wherein those assertion handlers that are determined to be configured to change the message are formatted to form a second compiled policy from the policy model for changing the received message to meet the requirements; and discarding the received message when the message fails to satisfy, or is not able to be modified to satisfy, such requirements of the policy document.

11. The method of claim 10, wherein the one or more logical operators are one or more of a usage qualifier, policy operator or policy preference.

12. The method of claim 10, further comprising the act of:
determining whether the message is either outgoing or incoming from the application; and
based on the determination, validating or enforcing the policy expression by processing the received message though the corresponding one or more assertion handlers.

13. The method of claim 10, wherein one or more of the plurality of policy assertions are security policies that provide one or more of security token propagation, message integrity and message confidentiality though one or more of a signature, encryption, token, and username/password credentials.

14. The method of claim 10, wherein one or more of the plurality of policy assertions are one or more of a message age requirement that specifies the acceptable time period the received message should be received by or a visibility requirement that specifies one or more portions of the received message be able to be processed by an intermediary or endpoint.

15. The method of claim 10, wherein at least one of the plurality of objects is within the policy document.

16. The method of claim 10, wherein the Web service engine receives messages, validates and enforces policies for a plurality of applications.

17. The method of claim 10, wherein the policy document is an eXtensible Markup Language (XML) WS-Policy or WS-Security document.

18. A computer program product used in a Web services environment that exchanges messages within a distributed system, the computer program product for implementing a method of processing policies that include a plurality of policy assertions associated with incoming or outgoing messages of an application, without having to have code within the application for executing the one or more policy assertions, the computer program product comprising one or more computer readable storage media having stored thereon computer executable instructions that, when executed by a processor, can cause the distributed computing system to perform the following:

receive a message at a Web service engine, the message being an outgoing message and having been sent by a sending application of a sender to a receiving endpoint of a receiver, the sender and the receiver being external to, and separate from, the Web service engine, the application being configured to exchange messages in a distributed system; and prior to receipt of the message by the receiver, and at the Web service engine disposed between the sender and the receiver:

access a policy document that is specific to the application sending the message received at the Web service engine, the policy document having been generated by the developer of the application sending the message received at the Web service engine and for identifying a plurality of objects corresponding to a plurality of policy assertions included in the policy document;

after identifying the plurality of objects identified in the policy document, generate at least one assertion handler for each object, which assertion handlers are software entities that include executable code configured to determine whether the received message can satisfy requirements described by the plurality of policy assertions included in the policy document generated by the developer of the application; and use the at least one assertion handler to determine whether the received message satisfies the requirements described by the policy document;

evaluate the at least one assertion handler to determine whether the received message can be modified using first a compiled policy to satisfy the requirements described by the policy document, the first compiled policy being formatted from the evaluated at least one assertion handler, wherein the first compiled policy is stored for applying to messages with similar endpoint destination and message types, and wherein when one or more of the at least one assertion handlers used to modify the received message are determined to be no longer capable of changing the message to conform to the requirements, an error is returned to the sending application;

after evaluating the at least one assertion handler to determine whether the received message can be modified using the first complied policy, evaluate one or more of the plurality of assertion handlers to determine whether the message can be modified to satisfy the requirements described by the policy document, and by using a second compiled policy for modifying the message to satisfy the requirements, wherein the second compiled policy is formatted from the one or more one assertion handlers evaluated to determine whether the message can be modified using the second compiled policy; and discard the received message to the receiving endpoint when the message fails to satisfy, or is not able to be modified to satisfy, the requirements of the policy document.

19. The computer program product of claim 18, wherein the policy document includes one or more policy identifiers for pointing to one or more of the plurality of objects.

20. The computer program product of claim 18, further comprising computer executable instructions that can cause the distributed computing system to perform the following:

determine whether the message is either outgoing or incoming from the application; and
based on the determination, validate or enforcing the plurality of policy assertions by processing the received message though the corresponding plurality of assertion handlers.

21. The computer program product of claim 18, wherein at least one of the plurality of objects is within the policy.

22. The computer program product of claim 18, wherein the Web service engine receives messages, validates and enforces policies for a plurality of applications.

23. A computer program product used in a Web services environment that exchanges messages in a distributed system, the computer program product for implementing a method of processing policies that includes a plurality of policy assertions that make up one or more policy expressions associated with incoming or outgoing messages of an application, without having to have code within the application for executing the one or more policy expressions, the computer program product comprising one or more computer readable storage media having stored thereon computer executable instructions that, when executed by a processor, can cause the distributed computing system to perform the following:

receive a SOAP message at a Web service engine, the message having been sent by a sending application of a sending computing system and to a receiving endpoint of a receiving computing system, the sending computing system and the receiving computing system being external to, and separate from, the Web service engine, and the application being configured to exchange messages in a distributed system; and at the Web service engine disposed between the sending computing system and the receiving computing system, and after receipt of the message by the Web service engine that is external to the sending application and prior to receipt of the message by the receiving endpoint:

access an XML policy document that is specific to the application sending the message received at the Web service engine and stored in a policy store along with other policies specific to other applications, the policy document having been generated by the developer of the application sending the message received at the Web service engine and for identifying a plurality of objects corresponding to a plurality of policy assertions included in the policy document, the policy assertions being in the form of declarative statements including at least requirements regarding a type of security token, digital signature, encoding, visibility to intermediate systems, message age, and SOAP message version for the message received at the Web service engine from the application, the policy assertions being combined using one or more logical operators to form a policy expression requiring each of the policy assertions be met by the message received at the Web service engine from the application, and the policy document including policy identifiers for pointing to policy objects stored in an object store outside the policy store;

after identifying the plurality of objects stored outside the policy document and in the object store, generate a policy model using a plurality of assertion handlers, which are software entities that include executable code configured to determine whether the received message can satisfy the requirements described by the policy expression included in the policy document generated by the developer of the application, wherein determining whether the received message can satisfy the requirements described by the policy expression included in the policy document includes:

determine whether the received message satisfies each of the requirements described by the policy expression included in the policy document; and when the received message does not satisfy any of the requirements described by the policy expression included in the policy document, determine whether the assertion handlers can modify the received message to satisfy each of the requirements described by the policy expression included in the policy document; and discard the received message when the received message fails to satisfy any of the requirements described by the policy expression included in the policy document, and the received message has not been able to be modified using a compiled policy document to satisfy each of the requirements described by the policy expression included in the policy document.

24. The computer program product of claim 23, wherein the one or more logical operators are one or more of a usage qualifier, policy operator or policy preference.

25. The computer program product of claim 23, further comprising computer executable instructions that can cause the distributed computing system to perform the following:

determine whether the message is either outgoing or incoming from the application; and based on the determination, validate or enforcing the policy expression by processing the received message though the corresponding one or more assertion handlers.

26. The computer program product of claim 23, wherein at least one of the plurality of objects is within the policy document.

27. The computer program product of claim 23, wherein the Web service engine receives messages, validates and enforces policies for a plurality of applications.

* * * * *